Patented Feb. 18, 1941

2,232,117

UNITED STATES PATENT OFFICE 2,232,117

ALKYL SUBSTITUTED BENZENE SULPHONATES

Lucas P. Kyrides, Webster Groves, Mo., assignor to Monsanto Chemical Company, St. Louis, Mo., a corporation of Delaware No Drawing. Application June 5, 1939,
Serial No. 277,450

13 Claims. (Cl. 260—505)

The present invention relates to improvements in moistening and penetrating media and the process of manufacturing the same.

The products of the present invention are particularly adaptable for and find use in the dyeing of fabrics and textiles wherein the penetration of the dye is facilitated. Furthermore, the products of the present invention are of particular value in the kier boiling of cotton fabrics with dilute aqueous caustic solution. The said compounds are also capable of being used to advantage in the paper and treating industry wherein it is desirable to improve the wetting effect. They may be used as penetrants in acid solutions which are used for carbonizing vegetable matter in wool. They may be employed as assistants in flax retting and as assistant in fulling and belting processes. They find use in sizing preparation in combination with the usual materials, such as starches, gelatin, and their equivalents. The products of the present invention may be conveniently employed as wetting, penetrating and like agents in bleaching liquors. In general, the products of the present invention may be added to lye liquors for mercerizing cotton; used to improve the absorption capacity of fibrous materials when such materials are subjected to treatment for finishing, softening, impregnating, water and mildew proofing; used in the leather industry as wetting agents in deliming, soaking, tanning and dyeing baths; and employed in conjunction with insecticidal compositions for enhancing the spreading and penetrating action thereof. The products of this invention may be used in a large number of processes and compositions which employ wetting agents.

Broadly, the invention relates to the use of a mixture of mono-sulphonated alkylated benzene hydrocarbons and their metallic salts, preferably the inorganic water-soluble salts such as the sodium and potassium salts, wherein at least one of the alkyl groups is obtained from a mixture of hydrocarbons having a distilling range of substantially 145–225° C. and consisting mostly of aliphatic-polymer mono-olefins and small amounts of aliphatic-polymer olefins which depolymerize at low temperatures in the presence of AlCl₃. The aromatic nucleus of these mono-sulphonated alkylated compounds are hydrocarbons of the benzene series or mixtures thereof, for example, benzene, toluene, xylene, ethyl benzene and the like, and which boil within the range of 79° to 184° C. but preferably within the range of 79° to 110° C. More particularly, the present invention relates to wetting agents comprising mixtures of mono-sulphonated mono-alkylated benzenes wherein said alkyl group is obtained from a mixture of hydrocarbons having a distilling range of substantially 145–175° C. or 145–215° C. and consisting mostly of aliphatic-polymer mono-olefins and small amounts of polymer olefins of the type that depolymerize in the presence of AlCl₃. In preparing the compounds of the present invention, the mixture of polymer mono-olefins is used as an alkylation medium, under conditions described hereinafter, in the presence of a Friedel-Crafts catalyst to prepare the desired alkylated benzene hydrocarbons. After separating this mixture of alkylated hydrocarbons from the reaction products, it is converted to the mono-sulphonic acid or corresponding water soluble sulphonate.

The mono-olefins present in the polymer hydrocarbons distilling within the range of 145–225° C. will consist mostly of the decenes, undecenes, dodecenes and tridecenes. The hydrocarbon polymers suitable for preparing the products of this invention contain certain types of aliphatic mono-olefines which depolymerize or break up into short chains under the conditions of the alkylation reaction. Triisobutylene is a typical example of the type of polymer olefins that depolymerize and form short chains during the alkylation reaction. These short chain formers, such as triisobutylene and olefins of similar structure are present in the polymers used in preparing the products of this invention and are referred to herein as depolymerizable polymer olefins. By using an excess of the hydrocarbon of the benzene series—at least five mols to one mol of the polymers—in the alkylation reaction, these short chain alkyl radicals resulting from depolymerized polymer olefins will form alkylated benzenes of lower boiling point than the alkylated benzenes formed from the polymer olefins that did not break up during the alkylation reaction—this reduces the formation of polyalkylated benzene hydrocarbons, some of which are of the same boiling point as the desired products whereas others are of high molecular weight.

The fraction of polymer mono-olefins used in preparing the product of this invention may be formed during the polymerization process used for the production of motor fuel and like products, wherein mixtures of normally gaseous olefin-containing hydrocarbons, such as those containing mostly propylene and butylenes, are used as the charging stock and are catalytically or thermally polymerized at elevated temperatures and pressures. The polymer olefins used in preparing the wetting agents are recovered from the other polymers produced by the polymerization reaction. The composition of the polymer-mono-olefins used in preparing the products of this invention will vary somewhat with the composition of the feed gas charged to the polymerizer, the composition of the catalyst, and the operating conditions used to effect the polymerization. Since the feed gases contain tertiary olefins such as isobutylene, the polymer resulting from the polymerization reaction will contain polymer tertiary mono-olefins, some of which are depolymerizable polymer olefins and will form short chain radicals under the conditions of the alkylation reaction. Some refiners use the well-known "solid phosphoric acid" type of catalyst which may be used at pressures ranging from about 200–650 lbs. and temperatures ranging from 315–415° F. to polymerize the gaseous charging stock whereas other refiners may use alumina suspended on silica at temperatures of 450–600° F. and pressures of about 1000–1600 pounds. Likewise, the well known sulphuric acid process may be used to polymerize these normally gaseous olefin-containing hydrocarbons. A preferred source of the polymer olefins is from a selective catalytic polymerization process wherein the feed gases consist mostly of butylenes; such processes may be performed under a variety of conditions, such as those set forth above.

The polymer boiling between substantially 145–225° C. but preferably 145–175° C. and used to prepare the compounds of this invention, will contain a substantial proportion of mono-olefin and these polymer mono-olefins are mostly aliphatic mono-olefins which contain small amounts of depolymerizable polymer olefins. While the concentration of olefins in these polymers will vary with the conditions used in their preparation, frequently it is as high as 85–95% and in general is above about 70%. The following table sets forth the properties of an illustrative example of the polymer mono-olefins that have been used to prepare the products of my invention:

EXAMPLE A

Refractive index at 20° C.  1.4395
Density at 20° C._____ 0.773
Bromine number_____ 94
Percent unsaturated_____ 94% (about)
Boiling range_____ 171–227° C.
  5% off at 182° C.
  96% off at 218° C.

In preparing the alkylated benzene hydrocarbons from the polymer mono-olefins, an excess of benzene, toluene or other benzene hydrocarbon is reacted with the polymer olefin with the aid of a Friedel-Crafts type of catalyst. Generally, one mol of the olefin is used for about each five to twelve mols of the benzene hydrocarbon but, preferably, one mol of the olefin is used for seven to ten mols of the benzene hydrocarbon. The polymer mono-olefins in the alkylation medium produce alkylated benzene hydrocarbons wherein the alkyl chain has the same number of carbon atoms as the polymer. By performing the alkylation reaction under the conditions indicated hereinafter, mostly the mono-alkylated benzene hydrocarbons are produced, that is, one alkyl chain having the same number of carbon atoms as a polymer hydrocarbon will be added to the benzene, toluene, xylene, etc., nucleus. However, the depolymerizable polymer olefins, or at least a portion of them present in the alkylation medium undergo a depolymerization reaction and yield hydrocarbon radicals that contain a smaller number of carbon atoms than the polymer mono-olefins. The presence of an excess of the hydrocarbon of the benzene series during the alkylation reaction greatly minimizes the polyalkylation of the benzene hydrocarbons by these short chain hydrocarbon radicals resulting from the depolymerized polymer olefins. The preferred wetting agents are obtained from those alkylated hydrocarbons wherein only one alkyl group is added by the alkylation reaction that uses the polymer mono-olefins as the alkylation medium.

By fractionating the admixture of alkylated hydrocarbons resulting from the alkylation reaction, these low boiling alkylated benzenes, or short-chain alkylated benzenes, can be separated from the desired alkylated benzenes resulting from the polymers that did not depolymerize. The mono-sulphonates of these alkylated benzene hydrocarbons, wherein the alkyl group is obtained from the undepolymerized polymer, have excellent wetting and penetrating properties.

The conditions used in carrying out the alkylation reaction may vary somewhat but it is advisable to observe the following conditions:

1. The catalyst, preferably aluminum chloride forms a complex and should not be reused.
2. Dry HCl should be present; 5 grams of HCl or less is sufficient per 500 grams of benzene.
3. The presence of iron in the reaction mass will materially retard or inhibit alkylation and for this reason glass-lined reaction vessels are preferably used.

The following example is given by way of illustration to further describe the alkylation procedure:

EXAMPLE I 320 grams of the polymer olefin (approximately 2 mols) boiling within the range of 145–175° C. are introduced into about 1,000 grams of dry benzene containing hydrogen chloride and approximately ten grams of anhydrous aluminum chloride. The olefins are added over a period of approximately 20 minutes and during this time the temperature of the mass will rise to about 60° C. The mass is stirred for one hour and then the catalyst complex is permitted to settle out. The upper layer, after neutralization with caustic, is fractionated to remove the unreacted benzene, polymers and low boiling alkylated benzenes from the mixture of alkylated benzenes having an alkyl chain formed from a polymer mono-olefin distilling within the range of substantially 145–175° C. In the distillation step, the unreacted benzene was removed by fractionation up to a vapor temperature of 115° C., vacuum was then applied and the unreacted polymers along with the low boiling alkylated benzenes removed at temperatures up to 115° C. at 1 mm. pressure, and the desired alkylated products removed between 115–170° C. at 1 mm. pressure.

The procedure used to form the mono-sulphonic acid derivative of the alkylated benzene hydrocarbon may be the same as that disclosed in my copending application Serial No. 88,625, filed July 2, 1936, wherein substantially 50 parts by weight of the alkylated benzene hydrocarbon and substantially 10 parts by weight of 95% sulphuric acid are placed in a suitable reactor and substantially 65 parts by weight of 25% oleum added slowly thereto, preferably with cooling. After the reaction is completed, water is added to effect the separation of the major portion of the spent acid, which is drawn off, and the upper layer comprising the mixture of mono-alkylated benzene mono-sulphonic acids is preferably converted to the desired metal salt. The following examples are given by way of illustration to further describe the sulphonation procedure.

EXAMPLE II

Twenty-five grams of the mixture of the mono-alkylated benzenes are placed in a glass-lined reaction vessel fitted with a stirrer, thermometer and dropping funnel. To the 25 grams of alkylated benzenes which have been chilled to approximately 0–5° C. are added 5 grams of 95% sulphuric acid over a period of 10 minutes. Then 30 grams of 22.5% oleum are added over a period of 1½ hours. The sulphonation reaction is preferably carried out at about the temperature of an ice bath. Stirring in an ice bath is continued for approximately one hour, then the bath is removed and the mixture stirred for about one-half hour without cooling. The ice-bath is then replaced and 10 grams water added slowly, not allowing the temperature to exceed about 10° C. The reaction mixture is then permitted to settle for approximately four hours, the lower layer, containing the major portion of the spent acid, is drawn off, the upper layer is dissolved in alcohol and neutralized with sodium hydroxide. After filtering off the sodium sulphate, the mono-sulphonated product is dried.

EXAMPLE III

To about 25 grams of the alkylated benzenes are added 44 grams of 100% sulphuric acid, rapidly. The temperature is allowed to rise to about 40° C. and the temperature maintained at 40° C. for about three hours. The mass is then cooled and 8 grams of water added while the temperature is maintained below about 25° C.. The mono-sulphonated product may then be separated from the spent acid in the manner described above in Example II.

By using the alkylation and sulphonation procedure hereindescribed, or their equivalents, efficient wetting agents may be prepared by using coal tar naphtha as the source of the hydrocarbon of the benzene series. For example, a coal tar naphtha having an end boiling point of about 100° C., 107° C., 110° C. or 140° C. may be used. The polymer mono-olefins used to alkylate these coal tar naphtha fractions are the same as those described herein.

The amount of catalyst used to alkylate the benzene hydrocarbons may be varied within relatively wide limits and other alkylating catalysts such as sulphuric acid and phosphoric acid may be used in the place of a Friedel-Crafts catalyst. It has been found, however, that aluminum chloride is the better catalyst for use in preparing the product of my invention.

The mixture of mono-sulphonated hydrocarbons herein described may be converted to any of their water soluble salts such as the sodium, potassium or ammonium salts.

The wetting properties of the alkylated benzene mono-sulphonate may be demonstrated by the Draves wetting test as outlined in the 1931 and 1932 Yearbooks of the American Association of Textile Chemists and Colorists. Briefly, the Draves wetting test consists in measuring the time of immersion of a 5 gram skein of unbleached cotton made up of 35/2 cotton yarn folded so as to be immersed in the liquid. This is attached to a 1.5 gram sinker which is itself attached to a heavy weight by means of a fine thread, so that the distance between them is one inch. When the skeins become thoroughly wetted, the small sinker causes it to fall to the bottom of the container, the time being accurately noted. The test is made in a tall cylinder. The pressure of an efficient wetting agent in the test solution will cause the skein to sink in a few seconds. The data set forth in the following table will illustrate the highly efficient wetting properties of the products to this invention:

*Draves wetting test at 25° C. using solutions of alkylated benzene mono-sodiumsulphonates*

| Number of carbon atoms in the olefins used to form the mixture of alkylated benzenes which were subsequently converted to the sulphonates | Time in seconds required for the skein to sink when tested in distilled water containing the wetting agent at the following concentrations | |
| --- | --- | --- |
| | 0.25% | 0.125% |
| $C_6$ (hexene-$_1$) | Over 180 | |
| $C_{10}$ | 2.4 | 5.2 |
| $C_{12}$ | 4.0 | 5.8 |
| $C_{11}$ to $C_{13}$ | 2.8 | 4.6 |
| $C_{16}$ | 30.8 | 41.0 |

It is thus clearly shown that the use of wetting agents comprising salts of mono-sulphonated alkylated benzene compounds, of the type herein described, comprises an important advance in the art. Heretofore, certain sulphonated alkylated aromatic compounds have been employed as wetting, penetrating and capillary agents. According to the present invention, however, it has been discovered that highly efficient wetting properties are present in those alkylated benzene mono-sulphonates which contain an alkyl group derived from an aliphatic polymer mono-olefin boiling within the range of 145–225° C. and preferably within the range of 145–175° C.

If desired, the hydrocarbon polymers used to prepare the alkylated benzenes may be subjected to a depolymerization treatment before being used to alkylate the benzene hydrocarbons. The conditions used in this pretreatment will vary somewhat with the composition of the polymers but, in general, the depolymerizing conditions should be sufficient to cause the depolymerizable polymer-olefins to react or decompose without causing appreciable polymerization of the other olefin polymers. For example, the polymer olefins may be mixed with about 1–3% by weight of a Friedel-Crafts catalyst, such as $AlCl_3$ and a small amount of HCl, and stirred for about 40 to 60 minutes at a low temperature not exceeding about 60° C., but preferably a temperature within the range of 30 to 50 minutes. The hydrocarbon polymers not altered by this treatment are separated by fractional distillation from the low boiling and high boiling products formed by the pretreatment. The recovered polymer olefins boiling within the range of 145–245° C. may be used to alkylate the benzene hydrocarbons under the conditions herein disclosed.

While my invention has been described and illustrated by specific examples, it is not limited thereby except as defined in the appended claims. This application is a continuation-in-part of my copending application, Serial No. 88,625, filed July 2, 1936.

1. A wetting agent comprising essentially a mixture of water-soluble salts of mono-sulphonated alkylated benzene compounds obtained by alkylating an excess of a hydrocarbon of the benzene series boiling within the range of 79–184° C. with a mixture of hydrocarbon-polymers distilling within the range of approximately 145–225° C. and comprising mostly aliphatic mono-olefins and small amounts of depolymerizable polymer olefins, separating from the alkylated products a mixture of alkylated benzene hydrocarbons having one alkyl group with the same number of carbon atoms as that contained in an olefin boiling within said range of approximately 145–225° C., mono-sulphonating the said separated mixture of alkylated benzene hydrocarbons and converting the mixture of sulphonic acid to the water-soluble salts.

2. A wetting agent comprising essentially a mixture of alkali metal salts of mono-sulphonated alkylated benzene compounds obtained by alkylating, by means of a Friedel-Crafts synthesis, an excess of a hydrocarbon of the benzene series boiling within the range of 79–140° C. with a mixture of hydrocarbon-polymers distilling within the range of approximately 145–225° C. and comprising mostly aliphatic mono-olefins and small amounts of depolymerizable polymer olefins, separating from the alkylated products a mixture of alkylated benzene hydrocarbons having one alkyl group with the same number of carbon atoms as that contained in an olefin boiling within said range of approximately 145–225° C., mono-sulphonating the said separated mixture of alkylated benzene hydrocarbons and converting the mixture of sulphonic acid to the alkali metal salts.

3. A wetting agent comprising essentially a mixture of mono-sulphonated alkylated benzene compounds obtained by alkylating an excess of a hydrocarbon of the benzene series boiling within the range of 79–184° C. with a mixture of hydrocarbon-polymer distilling within the range of approximately 145–225° C. and comprising mostly aliphatic mono-olefins and small amounts of depolymerizable polymer olefins, separating from the alkylated products a mixture of alkylated benzene hydrocarbons having one alkyl group with the same number of carbon atoms as that contained in an olefin boiling within said range of approximately 145–225° C., and mono-sulphonating said separated mixture of alkylated benzene hydrocarbons.

4. A wetting agent comprising essentially a mixture of alkali metal salts of mono-sulphonated alkylated benzene compounds obtained by alkylating, by means of aluminum chloride and small amounts of hydrogen chloride, an excess of hydrocarbons of the benzene series boiling within the range of 79–184° C. with a mixture of hydrocarbon-polymers distilling within the range of approximately 145–225° C. and comprising mostly aliphatic mono-olefins and small amounts of triisobutylene, separating from the alkylated products a mixture of alkylated benzene hydrocarbons having one alkyl group with the same number of carbon atoms as that contained in the olefin boiling within said range of approximately 145–225° C., mono-sulphonating said separated mixture of alkylated benzene hydrocarbons and converting the mixture of sulphonic acid to the alkali metal salts.

5. A wetting agent comprising essentially a mixture of water-soluble salts of mono-sulphonated mono-alkylated benzene obtained by alkylating, by means of a Friedel-Crafts catalyst, an excess of benzene with a mixture of hydrocarbon-polymers having a distilling range of approximately 145–175° C. and comprising mostly aliphatic mono-olefins and small amounts of depolymerizable polymer olefins, separating from the alkylated products a mixture of mono-alkyl benzene hydrocarbons having an alkyl group with the same number of carbon atoms as that contained in an olefin boiling within said range of approximately 145–175° C., mono-sulphonating the said separated mixture of mono-alkylated benzene hydrocarbon and converting the mixture of sulphonic acid to the water soluble salts.

6. A wetting agent comprising essentially a mixture of sodium salts of mono-sulphonated mono-alkylated benzene compounds obtained by alkylating an excess of benzene with a mixture of hydrocarbon-polymers distilling within the range of approximately 145–225° C. and comprising mostly aliphatic mono-olefins and small amounts of depolymerizable polymer olefins, separating from the alkylated products a mixture of the mono-alkylated benzene hydrocarbons having an alkyl group with the same number of carbon atoms as that contained in an olefin boiling within said range of approximately 145–225° C., mono-sulphonating the said separated mixture of mono-alkylated benzene hydrocarbons and converting the mixture of sulphonic acid to the sodium salts.

7. A wetting agent comprising essentially a mixture of sodium salts of mono-sulphonated alkylated benzene compounds obtained by alkylating an excess of a hydrocarbon of the benzene series boiling within the range of 79–110° C. with a mixture of hydrocarbon-polymers distilling within the range of approximately 145–175° C., and comprising mostly aliphatic mono-olefins and small amounts of depolymerizable polymer olefins, separating from the alkylated products a mixture of alkylated benzene hydrocarbons having one alkyl group with the same number of carbon atoms as that contained in an olefin boiling within said range of approximately 145–175° C., mono-sulphonating the said separated mixture of alkylated benzene hydrocarbons and converting the mixture of sulphonic acids to the sodium salts.

8. A wetting agent comprising essentially a mixture of sodium salts of mono-sulphonated mono-alkylated benzenes obtained by alkylating an excess of benzene with a mixture of hydrocarbon-polymers distilling within the range of approximately 145–175° C. and comprising mostly aliphatic mono-olefins and small amounts of depolymerizable polymer olefins, separating from the alkylated products a mixture of mono-alkylated benzenes having an alkyl group with the same number of carbon atoms as that contained in an olefin boiling within said range of approximately 145–175° C., mono-sulphonating the said separated mixture of mono-alkylated benzenes and converting the mixture of sulphonic acids to the sodium salts.

9. A method of preparing a wetting agent which comprises alkylating an excess of a hydrocarbon of the benzene series boiling within the range of 70–184° C. with a mixture of hydrocarbon-polymers distilling within the range of approximately 145–225° C. and comprising mostly aliphatic mono-olefins and small amounts of depolymerizable polymer olefins, separating from the alkylated products a mixture of alkylated benzene hydrocarbons having one alkyl group with the same number of carbon atoms as that contained in an olefin boiling within said range of approximately 145–225° C., sulphonating the thus separated alkylated benzene hydrocarbons to form the mono-sulphonic acid derivatives and converting the mixture of sulphonic acids to the water soluble salts.

10. A method of preparing a wetting agent which comprises alkylating a hydrocarbon of the benzene series boiling within the range of 79–110° C. with a mixture of hydrocarbon-polymers distilling within the range of approximately 145–175° C. and comprising mostly aliphatic mono-olefins, separating from the alkylated products a mixture of alkylated benzene hydrocarbons having one alkyl group with the same number of carbon atoms as that contained in an olefin boiling within said range of 145–175° C., mono-sulphonating the said separated mixture of alkylated benzene hydrocarbons and converting the mixture of sulphonic acids to the sodium salts.

11. A method of preparing a wetting agent which comprises alkylating an excess of benzene with a mixture of hydrocarbon polymers distilling within the range of approximately 145–225° C. and comprising mostly aliphatic mono-olefins and small amounts of depolymerizable polymer olefins, separating from the alkylated products a mixture of mono-alkylated benzene hydrocarbons having an alkyl group with the same number of carbon atoms as that contained in an olefin boiling within said range of 145–225° C., sulphonating the thus separated alkylated benzene hydrocarbons to form the mono-sulphonic acid derivatives and converting the mixture of sulphonic acid to the sodium salts.

12. A method of preparing a wetting agent which comprises alkylating an excess of benzene with a mixture of hydrocarbon-polymers having a distilling range of approximately 145–175° C. and comprising mostly aliphatic mono-olefins and small amounts of depolymerizable polymer olefins, separating from the alkylated products a mixture of mono-alkylated benzene hydrocarbons having an alkyl group with the same number of carbon atoms as that contained in an olefin boiling within said range of approximately 145–175° C., sulphonating the thus separated alkylated benzene hydrocarbons to form the mono-sulphonic acid derivatives and converting the mixture of sulphonic acid to the alkali metal salts.

13. A method of preparing a wetting agent which comprises alkylating an excess of a hydrocarbon of the benzene series boiling within the range of 79–184° C. with a mixture of hydrocarbon polymers distilling within the range of approximately 145–225° C., and comprising mostly aliphatic mono-olefins which will not depolymerize under the conditions of the alkylation reaction, separating from the alkylated product a mixture of alkylated benzene hydrocarbons having one alkyl group with the same number of carbon atoms as that contained in an olefin boiling within said range of approximately 145–225° C., mono-sulphonating said separated mixture of alkylated benzene hydrocarbons and converting the mixture of sulphonic acid to the alkali metal salts.

LUCAS P. KYRIDES.